United States Patent [19]

Chen

[11] Patent Number: 5,041,965
[45] Date of Patent: Aug. 20, 1991

[54] LAPTOP COMPUTER WITH DETACHABLE DISPLAY FOR OVERHEAD PROJECTOR

[75] Inventor: Chin-Mao Chen, Hsintien, Taiwan

[73] Assignee: Rever Computer Inc., Taipei City, Taiwan

[21] Appl. No.: 565,335

[22] Filed: Aug. 10, 1990

[51] Int. Cl.$^5$ .............................................. G06F 15/68
[52] U.S. Cl. ..................................... 364/200; 353/122; 353/DIG. 5; 364/237.5
[58] Field of Search ............... 353/DIG. 5, 122; 364/200 MS File, 900 MS File

[56] References Cited

U.S. PATENT DOCUMENTS

| | | | |
|---|---|---|---|
| 4,904,079 | 2/1990 | Yoshimura et al. | 353/DIG. 5 |
| 4,944,578 | 7/1990 | Denison | 353/DIG. 5 |
| 4,950,072 | 8/1990 | Honda | 353/DIG. 5 |
| 4,953,971 | 9/1990 | Highfill | 353/DIG. 5 |

OTHER PUBLICATIONS

*The Physics Teacher*, Sep. 1985, "Apparatus for Teaching Physics", by Connolly, pp. 382–383.

*Primary Examiner*—Lawrence E. Anderson
*Attorney, Agent, or Firm*—Oblon, Spivak, McClelland, Maier & Neustadt

[57] ABSTRACT

A laptop computer includes a display unit having a hollow display casing with a pair of window openings, a transparent LCD monitor display provided inside the display casing between the window openings, and a cover piece detachably mounted to the display casing at one of the window openings and having a mirror surface disposed adjacent to one side of the monitor display. The display casing has a lower hinge side detachably hinged to a rear hinge side of a main computer body. An extension cable is used to electrically connect the display unit and the main computer body when the display unit is detached from the main computer body. The cover piece is detachable from the display casing to permit the use of the display unit as a slide for an overhead projector, so that characters, graphs, etc. generated on the monitor display are projected onto a screen for viewing.

2 Claims, 6 Drawing Sheets 5,041,965

LAPTOP COMPUTER WITH DETACHABLE DISPLAY FOR OVERHEAD PROJECTOR

BACKGROUND OF THE INVENTION

The invention relates to a laptop computer, more particularly to a laptop computer which has a detachable display unit that can be used as a slice for an overhead projector.

A perspective view of a conventional laptop computer is shown in FIG. 1. The laptop computer comprises a main computer body 11, a keyboard unit 12, a handle 13 and a display unit 14. A hinge means 15 rotatably connects the display unit 14 to the main computer body 11. Most laptop computers employ a display unit 14 with a transparent LCD monitor display 141. A mirror (not shown) is disposed on one side of the monitor display 141 so that characters formed on the monitor display 141 may be clearly viewed by the user.

With the advent of office automation, it has been the goal of most manufacturers to link the computer with another indispensable piece of office equipment—the overhead projector. The present invention achieves such a link.

SUMMARY OF THE INVENTION

The objective of the present invention is to provide a laptop computer having a display unit which is detachably hinged to a main computer body and capable of serving as a slide for an overhead projector.

Accordingly, the preferred embodiment of a laptop computer of the present invention comprises a display unit that includes a hollow display casing having a pair of window openings, a transparent LCD monitor display provided inside the display casing between the window openings, a cover piece detachably mounted to the display casing at one of the window openings and having a mirror surface disposed adjacent to one side of the monitor display, and a display driver circuit means disposed inside the display casing to actuate the monitor display. The display casing has a lower hinge side detachably hinged to a rear hinge side of a main computer body. The display driver circuit means includes a male electrical connector provided on the lower hinge side of the display casing. The main computer body has a female electrical connector provided on a rotatable pivot seat on the rear hinge side to electrically connect and engage the male electrical connector of the display unit. An extension cable is used to electrically connect the male and female electrical connectors when the display unit is detached from the main computer body. The cover piece is detached from the display casing when the display unit is to be used as a slide for an overhead projector.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
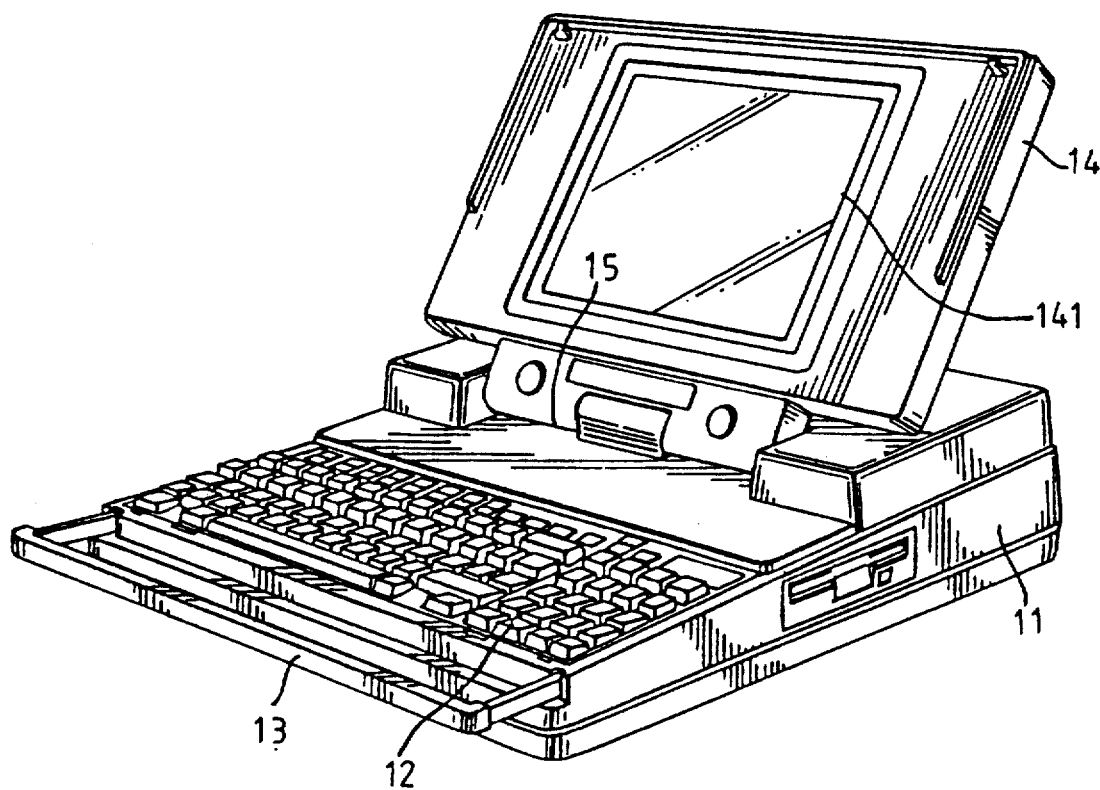
FIG. 1 is a perspective view of a conventional laptop computer.
Figure 2:
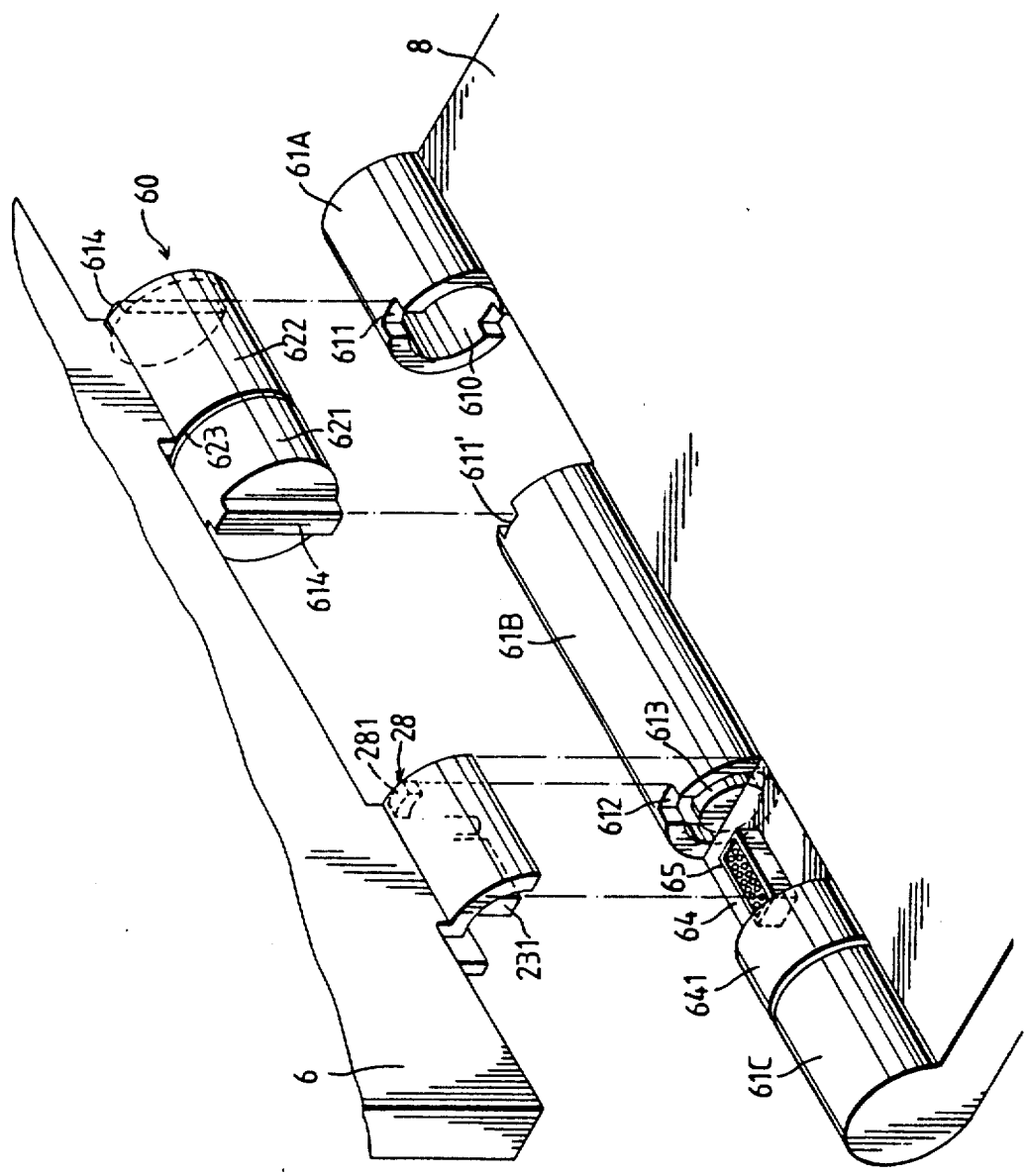
FIG. 2 is an enlarged perspective view illustrating the detachable hinge connection and the electrical connection between the display unit and the main computer body of the laptop computer according to the present invention.
Figure 3:
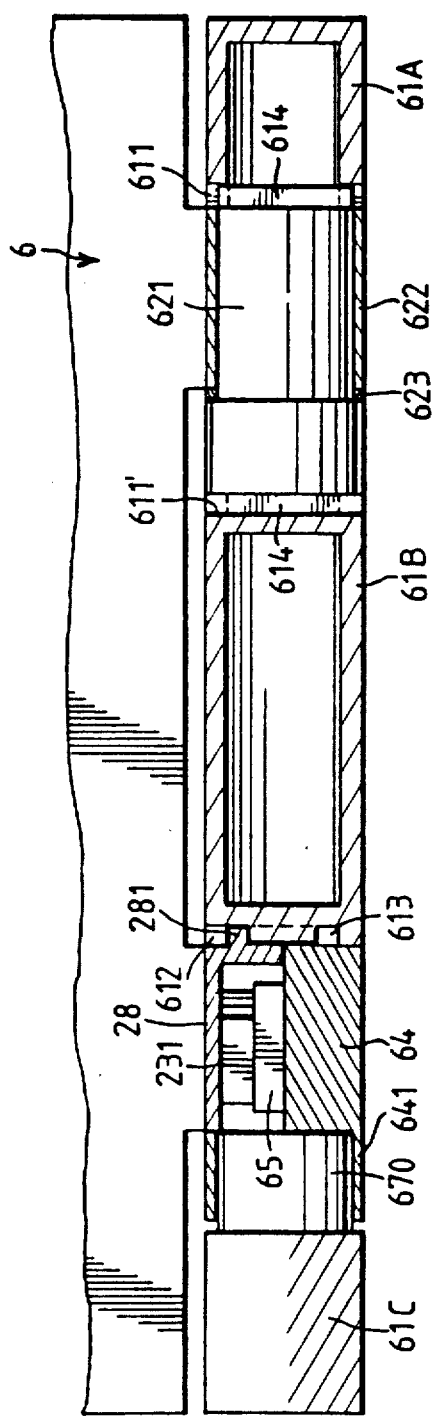
FIG. 3 is a sectional view illustrating the assembly of the display unit and the main computer body of the preferred embodiment.

FIGS. 2 and 3 illustrate a detachable hinge means 60 to connect the main computer body 8 and the display unit 6 of the laptop computer according to the present invention. The main computer body 8 has three cylindrical hinge sections 61A, 61B, and 61C in series and spaced from one another at a rear hinge side. The cylindrical hinge section 61A has one end 610 with a diametrically extending groove 611. The cylindrical hinge section 61B has one end facing the end 610 and is similarly formed with a diametrically extending groove 611' that is aligned with the groove 611. The cylindrical hinge section 61C has a restricted end 670. A rotatable pivot seat 64 is disposed between the cylindrical hinge sections 61B and 61C. The pivot seat 64 has an annular wall 641 sleeved around the restricted end 670 of the cylindrical hinge section 61C to rotatably engage the same. A female electrical connector 65 is provided on the pivot seat 64 and is electrically connected to circuitry inside the main computer body 8. The cylindrical hinge section 61B has a closed end facing the cylindrical hinge section 61C and is formed with an annular groove 613.

The display unit 6 has a lower hinge side with a hollow cylindrical lug projection 622. A cylindrical pivot pin 621 has a restricted portion inserted into the cylindrical lug 622. A friction piece 623 is placed between the pivot pin 621 and the cylindrical lug 622 to permit positioning of the display unit 6 at any angle relative to the main computer body 8. The pivot pin 621 has two ends, each formed with a diametrically extending cross projection 614. The cross projections 614 are received by the grooves 611 and 611', thus making the pivot pin 621 stationary relative to the main computer body 8. The display unit 6 further has a male electrical connector 231 provided on the lower hinge side, to engage with the female electrical connector 65 of the main computer body 8, thus electrically connecting the display unit 6 to the circuitry of the main computer body 8. A curved wall 28, which is quarter-circular in cross-section, extends from the lower hinge side of the display unit 6 and is adjacent to the male electrical connector 231. The curved wall 28 has a lower end abutting the pivot seat 64. The curved wall 28 bridges the annular wall 641 of the pivot seat 64 and the cylindrical hinge section 61B when the display unit 6 is attached to the main computer body 8. The curved wall 28 has a projection 281 that projects into the annular groove 613 to rotatably engage the cylindrical hinge section 61B.

When the display unit 6 is rotated from a closed position to a position of use, the cylindrical lug 622 is correspondingly rotated about the pivot pin 621. The curved wall 28 pushes the pivot seat 64 and correspondingly rotates the same. Should it be desired to disengage the display unit 6 from the main computer body 8, the display unit 6 is first rotated until the projection 281 is aligned with a notch 612 of the cylindrical hinge section 61B. The display unit 6 is then pulled away from the main computer body 8, disengaging the male electrical connector 231 from the female electrical connector 65, and removing the cross projections 614 from the grooves 611 and 611'.

Figure 5:
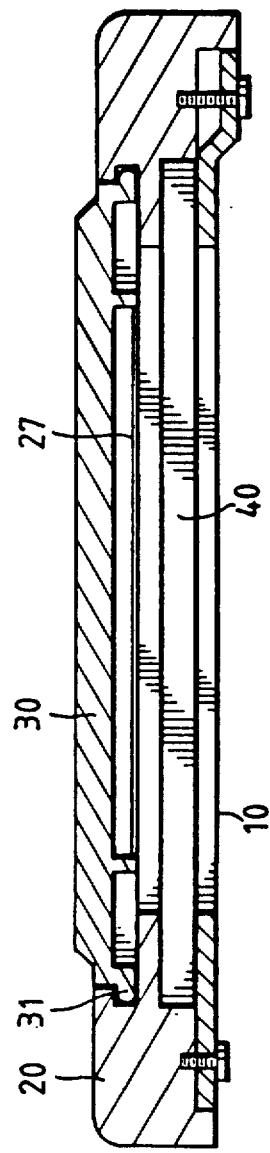
FIG. 5 is a sectional view of the display unit illustrating its assembly.
Figure 4:
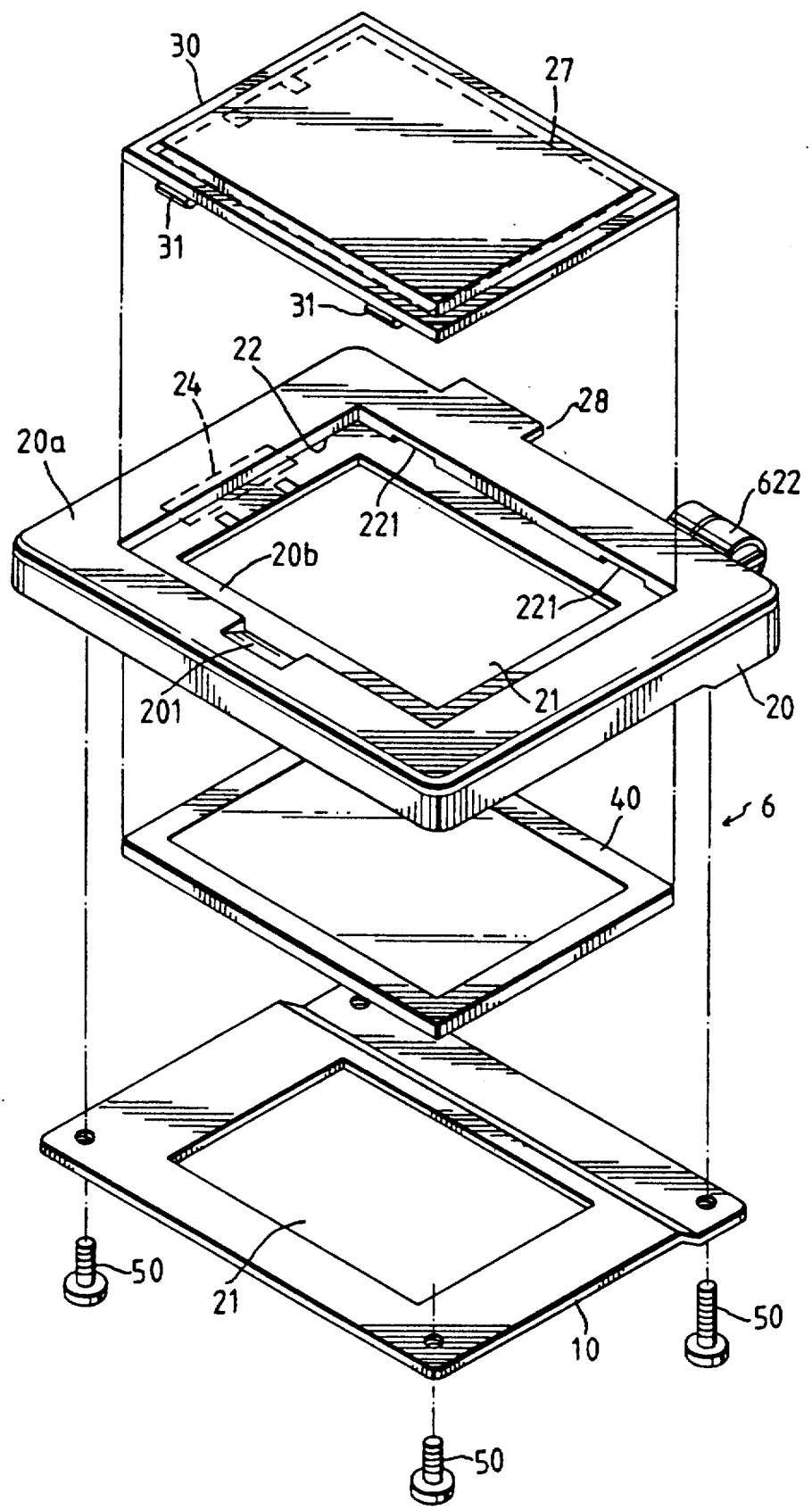
FIG. 4 is an exploded view of the display unit of the laptop computer of the present invention.

Referring to FIGS. 4 and 5, the display unit 6 is shown to comprise a protective cover 10, a main display casing 20, a detachable cover piece 30, and a display monitor 40. The display casing 20 has first and second walls 20a and 20b. The first and second walls 20a and 20b of the main display casing 20, and the protective cover 10 each have a rectangular central window opening 21. The inner surface 22 of the first wall 20a has a plurality of elongated recesses 221 formed at the periphery confining the opening 21. The first wall 20a further has a downwardly inclining recess 201 formed at the periphery confining the opening 21. A display driver circuit 24 is mounted on the inner surface of the first wall 20a. The main display casing 20 includes the curved wall 28 and the cylindrical lug 622. The display driver circuit 24 is used to actuate the monitor display 40 and is electrically connected to the male electrical connector 231 provided on the lower hinge side of the main display casing 20.

Figure 6:
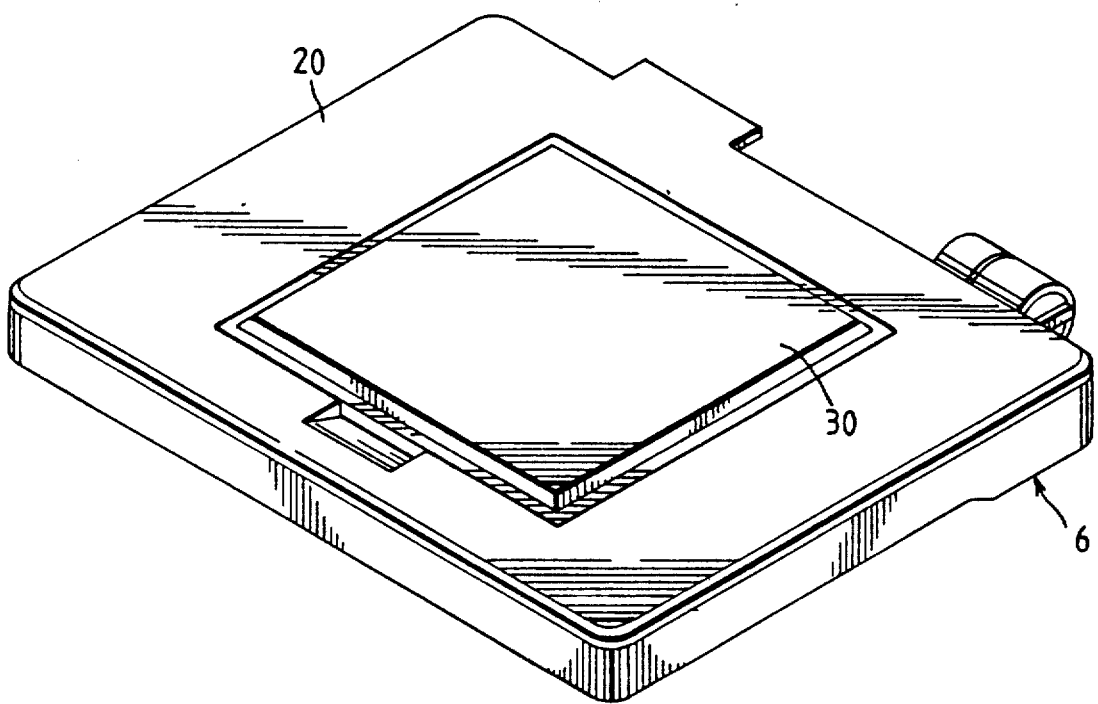
FIG. 6 is a perspective view of the assembled display unit.

The cover piece 30 has a plurality of engaging pieces 31 projecting from a lower peripheral end. The engaging pieces 31 are receivable in the recesses 221 of the main display casing 20 to engage the cover piece 30 with the main display casing 20 at the window opening 21 of the first wall 20a. A mirror 27 is fixed to a bottom face of the cover piece 30. The monitor display 40 is clamped between the second wall 20b of the main display casing 20 and the protective cover 10. Screws 50 are used to fasten the protective cover 10 to the main display casing 20. The monitor display 40 is a transparent LCD display. The construction of such a display is known in the art and will not be detailed herein. The mirror 27 is provided adjacent to one side of the monitor display 40 to allow ease of discerning characters formed on the monitor display 40. A perspective view of the display unit 6 when in an assembled form is shown in FIG. 6.

Figure 7:
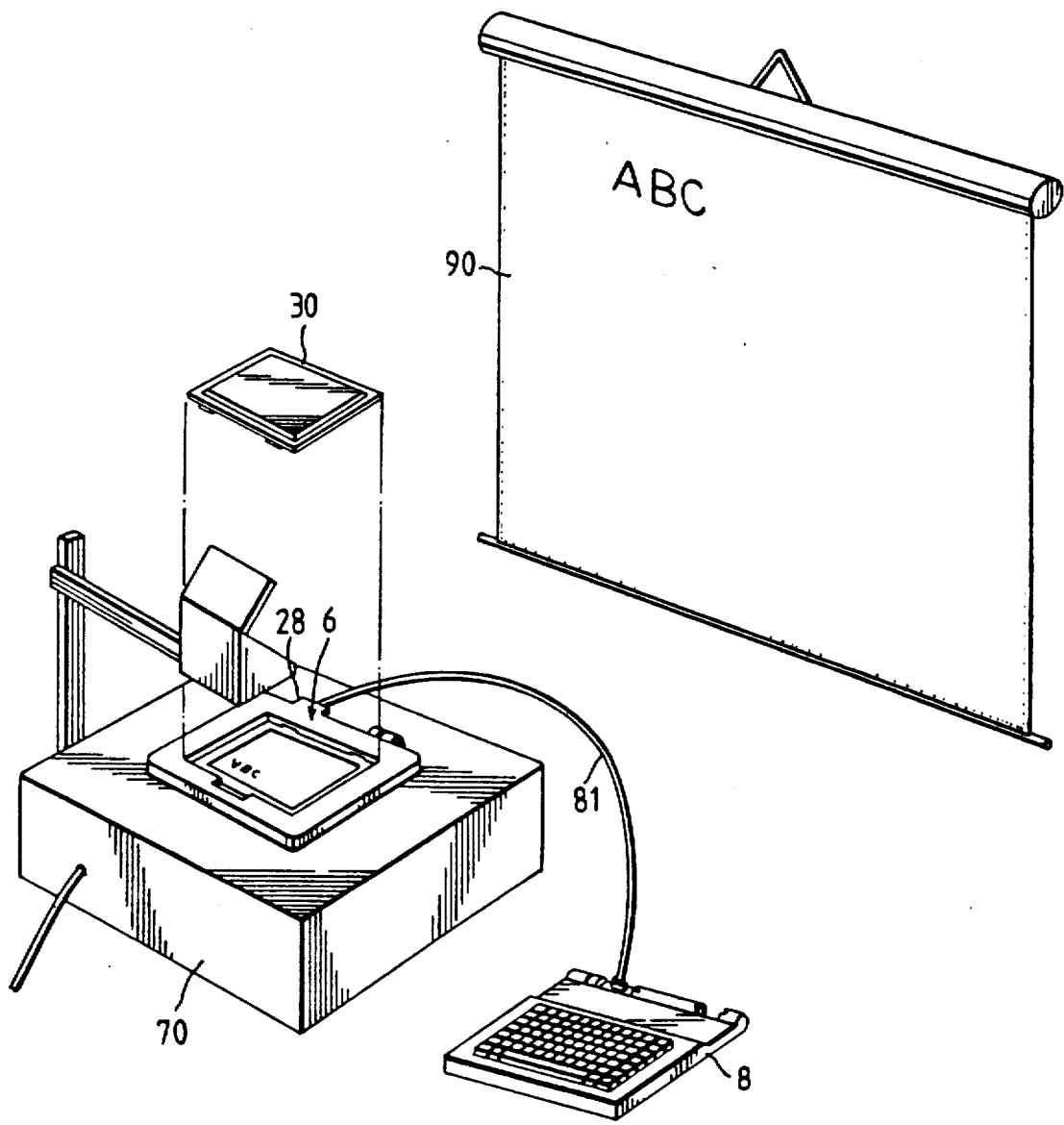
FIG. 7 is an illustration of the proposed configuration of the preferred embodiment when used in combination with an overhead projector.

FIG. 7 illustrates the preferred configuration of the laptop computer of the present invention when used in combination with a conventional overhead projector 70. The display unit 6 is detached from the main computer body 8. The cover piece 30 is disengaged from the main display casing 20 by lifting the cover piece 30 from the main display casing 20 by grasping the cover piece 30 at the inclined recess 201 to remove the engaging pieces 31 from the recesses 221. An extension cable 81 electrically connects the male electrical connector 231 and the female electrical connector 65. The display unit 6 is then placed on top of the lens of the overhead projector 70, and serves as a transparent slide for the same. Characters formed on the display unit 6 can thus be seen on the projector screen 90. The preferred embodiment therefore permits the projection of files and graphs stored in computer memory devices on the projector screen 90. This illustrates the utility of the present invention.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A laptop computer comprising a main computer body and a display unit rotatably mounted to said main computer body and electrically actuated by the same, said display unit including a hollow display casing having a pair of window openings, a transparent LCD monitor display provided inside said display casing between said window openings, a cover piece detachably mounted to said display casing at one of said window openings, said cover piece having a mirror surface disposed adjacent to said monitor display, and a display driver circuit means disposed inside said display casing to actuate said monitor display, said display casing having a first hinge side detachably hinged to an adjacent second hinge side of said main computer body, said display driver circuit means including a first electrical connector provided on said display casing, said main computer body having a second electrical connector engaging said first electrical connector when said first and second hinge sides are connected, said laptop computer further comprising an extension cable to electrically connect said first and said second electrical connectors when said display unit is detached from said main computer body, and means for detaching said cover piece from said display casing for enabling said display unit to be used as a slide for an overhead projector.

2. The laptop computer as claimed in claim 1, wherein said first electrical connector is provided on said first hinge side, said second electrical connector being provided on said second hinge site, said first electrical connector engaging said second electrical connector when said display unit is attached to said main computer body; said main computer body further comprising a first, a second and a third cylindrical hinge section in series and being spaced from one another on said second hinge side, and a rotatable pivot seat of semi-circular cross section provided between said first and said second cylindrical hinge sections, said pivot seat rotatably engaging said first cylindrical hinge section; said display casing further having a curved wall of quarter-circular cross section extending from said first hinge side and adjacent to said first electrical connector, said curved wall having one end abutting said pivot seat, said curved wall also being disposed between said first and said second cylindrical hinge sections when said display unit engages said main computer body, said curved wall further being detachably and rotatably connected to said second cylindrical hinge section; said display casing further having a hollow cylindrical lug provided on said first hinge side; said laptop computer further comprising a cylindrical pivot pin having a portion inserted in said cylindrical lug and two ends detachably engaging said second and said third cylindrical hinge sections, said pivot pin being stationary relative to said main computer body and said cylindrical lug being rotatable relative to said pivot pin when said display unit engages said main computer body.

* * * * *